(12) United States Patent
Roeben et al.

(10) Patent No.: US 11,767,101 B2
(45) Date of Patent: Sep. 26, 2023

(54) FLIGHT CONTROL SYSTEM COMPRISING A HYDRAULIC SERVO ACTUATOR

(71) Applicant: Liebherr-Aerospace Lindenberg GmbH, Lindenberg (DE)

(72) Inventors: Tobias Roeben, Allgaeu (DE); Thomas Sauterleute, Wangen (DE); Anton Gaile, Leutkirch (DE)

(73) Assignee: LIEBHERR-AEROSPACE LINDENBERG GMBH, Lindenberg (DE)

( * ) Notice: Subject to any disclaimer, the term of this patent is extended or adjusted under 35 U.S.C. 154(b) by 163 days.

(21) Appl. No.: 17/453,589

(22) Filed: Nov. 4, 2021

(65) Prior Publication Data

US 2022/0144414 A1 May 12, 2022

(30) Foreign Application Priority Data

Nov. 6, 2020 (DE) ...................... 10 2020 129 344.5

(51) Int. Cl.
| | | |
|---|---|---|
| B64C 13/50 | (2006.01) | |
| B64C 13/28 | (2006.01) | |
| F15B 13/04 | (2006.01) | |
| F15B 13/043 | (2006.01) | |
| B64C 13/40 | (2006.01) | |
| F15B 21/08 | (2006.01) | |

(52) U.S. Cl.
CPC .......... *B64C 13/504* (2018.01); *B64C 13/341* (2018.01); *B64C 13/40* (2013.01); *B64C 13/50* (2013.01); *F15B 13/0401* (2013.01); *F15B 13/0435* (2013.01); *F15B 21/087* (2013.01); *F15B 2013/0409* (2013.01); *F15B 2211/6656* (2013.01)

(58) Field of Classification Search
CPC ....... B64C 13/40; B64C 13/50; B64C 13/504; F15B 13/0401; F15B 13/0435; F15B 21/087; F15B 2013/0409; F15B 2211/6656
See application file for complete search history.

(56) References Cited

U.S. PATENT DOCUMENTS

| | | | | |
|---|---|---|---|---|
| 7,048,234 B2 * | 5/2006 | Recksiek | ........... | B64D 45/0005 244/75.1 |
| 2016/0280360 A1 * | 9/2016 | Glas | ........................ | B64C 25/50 |
| 2020/0198769 A1 * | 6/2020 | Miyazono | ............... | B64C 13/50 |

FOREIGN PATENT DOCUMENTS

| | | |
|---|---|---|
| DE | 102010007042 A1 | 8/2011 |
| DE | 102010021576 A1 | 12/2011 |
| DE | 102011115360 A1 | 4/2013 |
| JP | 6779183 B2 | 11/2020 |

\* cited by examiner

*Primary Examiner* — Richard G Davis
(74) *Attorney, Agent, or Firm* — McCoy Russell LLP

(57) ABSTRACT

The disclosure relates to a flight control system comprising at least one hydraulic servo actuator, wherein the servo actuator includes a two-stage electrohydraulic servo valve, wherein the servo valve comprises a pilot stage in which the control current is translated into a hydraulic control pressure, and a power stage in which a valve slide is moved in response to the control pressure in order to adjust the throughflow direction and throughflow cross-section of the valve. The disclosure furthermore relates to an aircraft comprising such a flight control system.

11 Claims, 1 Drawing Sheet

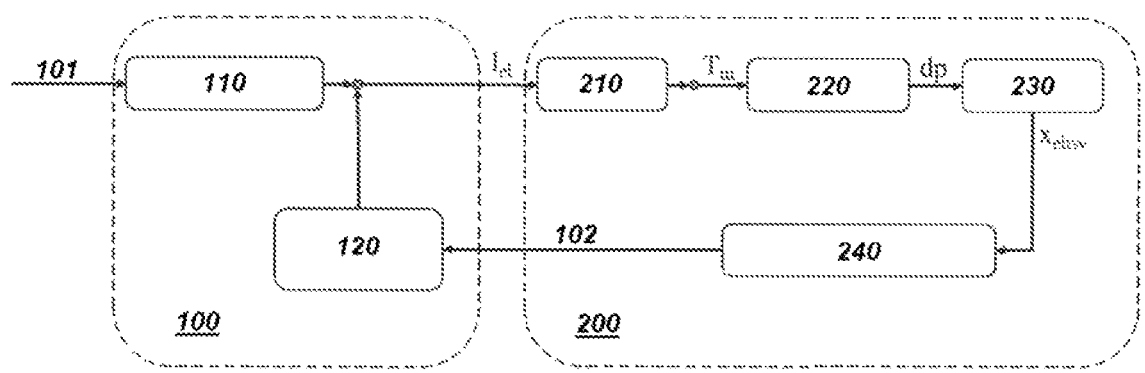

FLIGHT CONTROL SYSTEM COMPRISING A HYDRAULIC SERVO ACTUATOR

CROSS REFERENCE TO RELATED APPLICATION

The present application claims priority to German Patent Application No. 10 2020 129 344.5 filed on Nov. 6, 2020. The entire contents of the above-listed application is hereby incorporated by reference for all purposes.

TECHNICAL FIELD

This disclosure relates to a flight control system comprising at least one hydraulic servo actuator.

BACKGROUND

Flight control systems regularly employ hydraulic servo actuators at which a control command is translated into a change in attitude by adjusting the hydraulic pressure in hydraulic cylinders in order to actuate control surfaces of the aircraft. For example, such servo actuators comprise two-stage electrohydraulic servo valves (EHSV) with a pilot stage and a power stage. In the pilot stage, a control current is translated into a hydraulic control pressure by means of an electromagnetic drive. The power stage includes a valve slide that is moved in response to the control pressure generated in the pilot stage. The position of the valve slide determines the throughflow direction and throughflow cross-section of the valve.

SUMMARY

To ensure a stable response behavior of electrohydraulic servo valves, a so-called feedback is required, which represents a coupling between the pilot stage and the valve slide and exerts a resetting force on the pilot stage when the valve slide is moved. Here, a distinction is made among other things between mechanical feedbacks, in which coupling is effected by a mechanical spring or the like, and electric feedbacks in which the position of the valve slide is determined for example by means of a linear variable transducer (LVT) and is taken into account when generating the control current for the pilot stage.

In conventional flight control systems, the control currents for the servo actuators are generated in the central flight control computer (FCC). The actuation of the servo actuators hence is effected in an analog way by means of a control current specification. Correspondingly, electrohydraulic servo valves with mechanical feedback generally are employed in servo actuators of flight control systems, as an electric feedback using the detour of the central flight control computer would not be technically expedient.

Modern aircraft designs reveal the tendency to supplement the central flight control computer, which typically is accommodated in the aircraft fuselage, by a network of decentral control units (REUs—remote electronic units) and to decentralize some functions which in conventional flight control systems are performed by the central flight control computer. Such decentral control units, for example, can also be arranged in the wings.

It is the object of the disclosure to further optimize flight control systems by utilizing the options resulting from the use of such decentral control units.

Against this background, the disclosure relates to a control system of an aircraft, wherein the system includes a control unit that is configured to generate a control current in response to a control signal, and wherein the system furthermore includes a hydraulic servo actuator for translating the control current into a movement of a control surface of the aircraft, wherein the servo actuator includes a two-stage electrohydraulic servo valve, wherein the servo valve comprises a pilot stage in which the control current is translated into a hydraulic control pressure, and comprises a power stage in which a valve slide is moved in response to the control pressure in order to adjust the throughflow direction and throughflow cross-section of the valve.

In accordance with the disclosure it is provided that the control unit is arranged on the aircraft decentrally and at a distance from a central flight control computer, and that the servo valve includes an electric feedback. Hence, it is provided to replace the mechanical feedbacks commonly used in servo valves of aircraft control systems by an electric feedback. This possibility is created by employing a network of digitally communicating, decentral control units in the aircraft control system, as an electric feedback can be implemented via a decentral control unit that is associated to the servo actuator and may be accommodated in close spatial vicinity of the servo actuator.

The decentral control unit is interposed between the associated servo actuator and the central flight control computer. It translates a control signal of the central flight control computer into a control current of the servo valve.

The electric feedback stabilizes the servo valve by taking account of the position of the valve slide, which can be determined for example by means of a linear variable transducer (LVT), when generating the control current. Hence, the system can include a sensor for determining the position of the valve slide that is signal-connected to the decentral control unit.

Hence, the regulation concept of the servo valve in one embodiment comprises a regulation component (from the electric feedback) and a pilot control component (from the control signal of the central flight control computer).

Alternatively, it can be provided that the regulation concept of the servo valve comprises regulation components from the electric feedback and from the control signal of the central flight control computer.

For example, the decentral control unit and the servo actuator of the system can be arranged in the wings of the aircraft. Alternatively or additionally, the decentral control unit and the servo actuator of the system can also be mounted in the tail unit of the aircraft. The central flight control computer typically is arranged in the aircraft fuselage.

For instance, the decentral control unit and the associated servo actuator can be comprised by a common constructional unit. In the present connection, a common constructional unit for example is understood to be the assembly in a common housing or on a common assembly structure, which can be disposed for example in a suitable installation space in the wing of the aircraft. As an alternative to a common constructional unit, there can also be provided an arrangement of the decentral control unit and the associated servo actuator in spatial proximity, in the sense for example of an installation in the same portion of a wing of the aircraft.

It can be provided that a plurality of servo actuators are associated to the decentral control unit and that the decentral control unit implements an electric feedback of the servo valves comprised by this plurality of servo actuators.

For example, the system can include one or more pairs of functional units with a decentral control unit and one or more servo actuators associated to the same. The two functional units of each of the pairs can be arranged at corresponding positions on the two wings of the aircraft and use their servo actuators to act on corresponding control surfaces of the two wings.

The disclosure furthermore relates to an aircraft comprising a flight control system according to the disclosure. The aircraft comprises an aircraft fuselage, wings, control surfaces and the control system according to the disclosure, which serves for actuating one or more of the control surfaces. A central flight control computer of the aircraft is configured to conduct positional commands of a pilot or flight guidance system for controlling the flight path to the decentral control unit of the system according to the disclosure. Certain embodiments of the flight control system and variants of the installation of the individual components of the flight control system in the aircraft can be taken from the above description of the flight control system.

One advantage of the disclosure is the possibility of saving costs, as the valve without mechanical feedback involves a reduced manufacturing, assembly and adjusting effort. Furthermore, the mechanical independence of the two stages of the servo valve provides greater design freedoms as regards the arrangement of the valve and its integration in the servo actuator.

The electric feedback as compared to a mechanical feedback also extends the adjustment possibilities with respect to the operating behavior. In a system according to the disclosure it is possible for example to specifically influence the throughflow characteristic of the valve and specifically influence performance characteristics that were not independent in systems from the prior art.

In addition, the internal leakage and hence the power loss of the servo valve can be reduced, as less actuating force (authority) is now required in the electromagnetic preliminary stage of the valve to deflect the valve slide of the second stage in the absence of a mechanical feedback.

BRIEF DESCRIPTION OF THE FIGURES

Further details of the disclosure can be taken from the exemplary embodiment described below with reference to FIG. 1.

FIG. 1 shows an exemplary regulation with the electric feedback in servo valves of aircraft control systems according to the disclosure.

DETAILED DESCRIPTION

A decentral control unit 100 of the system translates a digital control signal 101, which is received by a central flight control computer, into a control current $I_{el}$. In an electromagnetic actuation 210 of the servo valve 200, the control current $I_{el}$ effects the generation of a moment $T_m$ that acts on a movable component 220 in order to generate a pressure difference $d_p$ in a hydraulic control circuit of the valve 200. Depending on the configuration of the servo valve 200, the component 220 for example can be a beam splitter, a baffle plate or a movable nozzle. In response to the pressure difference $d_p$ in the hydraulic control circuit, a valve slide 230 is moved in the power stage of the valve 200, whereby the throughflow cross-section of the valve and thus the working pressure in the working circuit of a servo actuator of the system is changed.

In conventional servo valves, as they are employed in prior art flight control systems, the valve slide 230 is mechanically connected to the electromagnetic actuation 210 and/or the component 220 in order to stabilize the valve 200 in connection with a mechanical feedback.

In the system of the disclosure, this mechanical feedback is replaced by an electric feedback. For this purpose, the servo valve 200 of the system of the disclosure includes a linear variable transducer 240 by means of which the slide position $x_{ehsv}$ can be determined. From this slide position $x_{ehsv}$ a regulating signal 102 is generated, which is evaluated in the decentral control unit and is taken into account when generating the control current $I_{el}$.

Hence, the regulation concept of the servo valve of the disclosure comprises a regulation component (from the electric feedback) and a pilot control component (from the control signal of the central flight control computer). In connection with the regulation, the interaction of all hydraulic, mechanical and electrical forces must be taken into account. The discrete regulation is split up into a pilot control component 110 with pole specification (dynamic pre-control), which can be executed on a field-programmable gate array (FPGA), and a regulation component (P-controller) 120, which takes account of the slide position in the form of an LV(D)T signal 102 as feedback. The pilot control can utilize the mathematical model of the idealized servo valve to determine the pilot current (static pre-control).

The invention claimed is:

1. A control system of an aircraft, wherein the system includes a control unit that is configured to generate a control current in response to a control signal, and wherein the system furthermore includes a hydraulic servo actuator for translating the control current into a movement of a control surface of the aircraft, wherein the servo actuator includes a two-stage electrohydraulic servo valve, wherein the servo valve comprises a pilot stage in which the control current is translated into a hydraulic control pressure, and comprises a power stage in which a valve slide is moved in response to the control pressure in order to adjust a throughflow direction and a throughflow cross-section of the valve, wherein
the control unit is arranged on the aircraft decentrally and at a distance from a central flight control computer, and that the servo valve includes an electric feedback.

2. The system according to claim 1, wherein the servo valve has no mechanical feedback.

3. The system according to claim 1, wherein the system includes a sensor for determining a position of the valve slide, which is signal-connected to the decentral control unit.

4. The system according to claim 3, wherein the sensor is a linear variable transducer (LVTD).

5. The system according to claim 3, wherein the decentral control unit is configured to generate the control current by taking account of a regulation component from the electric feedback and a pilot control component from the control signal of the central flight control computer.

6. The system according to claim 3, wherein the decentral control unit is configured to generate the control current by taking account of a regulation component from the electric feedback and from the control signal of the central flight control computer.

7. The system according to claim 3, wherein the decentral control unit and the servo actuator of the system are arranged on a wing or a tail unit of the aircraft.

8. The system according to claim 3, wherein the decentral control unit and the servo actuator of the system are comprised by a common constructional unit.

9. The system according to claim 3, wherein a plurality of servo actuators are associated to the decentral control unit and that the decentral control unit implements an electric feedback of the servo valves comprised by this plurality of servo actuators.

10. The system according to claim 1, wherein the system includes one or more pairs of functional units with a decentral control unit and one or more servo actuators associated to the same, each configured according to claim 1, wherein it is provided that the two functional units of each of the pairs are arranged at corresponding positions on the two wings of the aircraft and use their servo actuators to act on corresponding control surfaces of the two wings.

11. An aircraft comprising a flight control system according to claim 1.

\* \* \* \* \*